United States Patent

Diebel et al.

[19]

[11] Patent Number: 6,092,384
[45] Date of Patent: Jul. 25, 2000

[54] COOLER FOR FITTING ON A CONTROL BOX

[75] Inventors: Michael Diebel, Dillenburg; Frank Kuster, Breitscheid-Medenbach; Achim Edelmann, Dillenburg-Donsbach, all of Germany

[73] Assignee: Rittal-Werk Rudolf Loh GmbH & Co. KG, Herborn, Germany

[21] Appl. No.: 09/142,415

[22] PCT Filed: Feb. 13, 1997

[86] PCT No.: PCT/EP97/00661

§ 371 Date: Sep. 3, 1998

§ 102(e) Date: Sep. 3, 1998

[87] PCT Pub. No.: WO97/34348

PCT Pub. Date: Sep. 18, 1997

[30] Foreign Application Priority Data

Mar. 13, 1996 [DE] Germany ............... 196 09 796

[51] Int. Cl.[7] ............................................. F25D 23/12
[52] U.S. Cl. ................................. 62/259.1; 62/248
[58] Field of Search .................... 62/259.1, 259.2, 62/298, 428

[56] References Cited

U.S. PATENT DOCUMENTS

| | | |
|---|---|---|
| 4,043,143 | 8/1977 | Fluder et al. ............... 62/243 |
| 4,609,126 | 9/1986 | Janda . |
| 4,641,502 | 2/1987 | Aldrich et al. ............. 62/244 |
| 4,905,478 | 3/1990 | Matsuda et al. ........... 62/244 |
| 5,029,452 | 7/1991 | Mourabet et al. ......... 62/298 |
| 5,184,474 | 2/1993 | Ferdows .................... 62/244 |

FOREIGN PATENT DOCUMENTS

| | | |
|---|---|---|
| 284 889 A2 | 3/1988 | European Pat. Off. . |
| 81 30 651 | 5/1982 | Germany . |
| 37 10566 C 2 | 3/1990 | Germany . |
| 295 19 260 U 1 | 3/1996 | Germany . |
| 5-30398 | 2/1993 | Japan ................. 62/259.1 |
| 658 511 A 5 | 11/1986 | Switzerland . |

*Primary Examiner*—Henry Bennett
*Assistant Examiner*—Melvin Jones
*Attorney, Agent, or Firm*—Jansson, Shupe, Bridge & Munger, Ltd.

[57] ABSTRACT

The invention relates to a cooler which can be fitted on the cover of a control box and connected thereto via an inlet aperture. The rain and dustproofing is improved by the invention in that an air inlet and outlet are fitted in the top of the cooler housing away from the control box, a cover component is connected to the top of the cooler housing at a distance therefrom, projects on all sides of the cooler housing and forms around it a downwardly open ventilation grille and is divided by partitions in the cover component into at least two chambers connected to the air inlet and outlet.

9 Claims, 1 Drawing Sheet

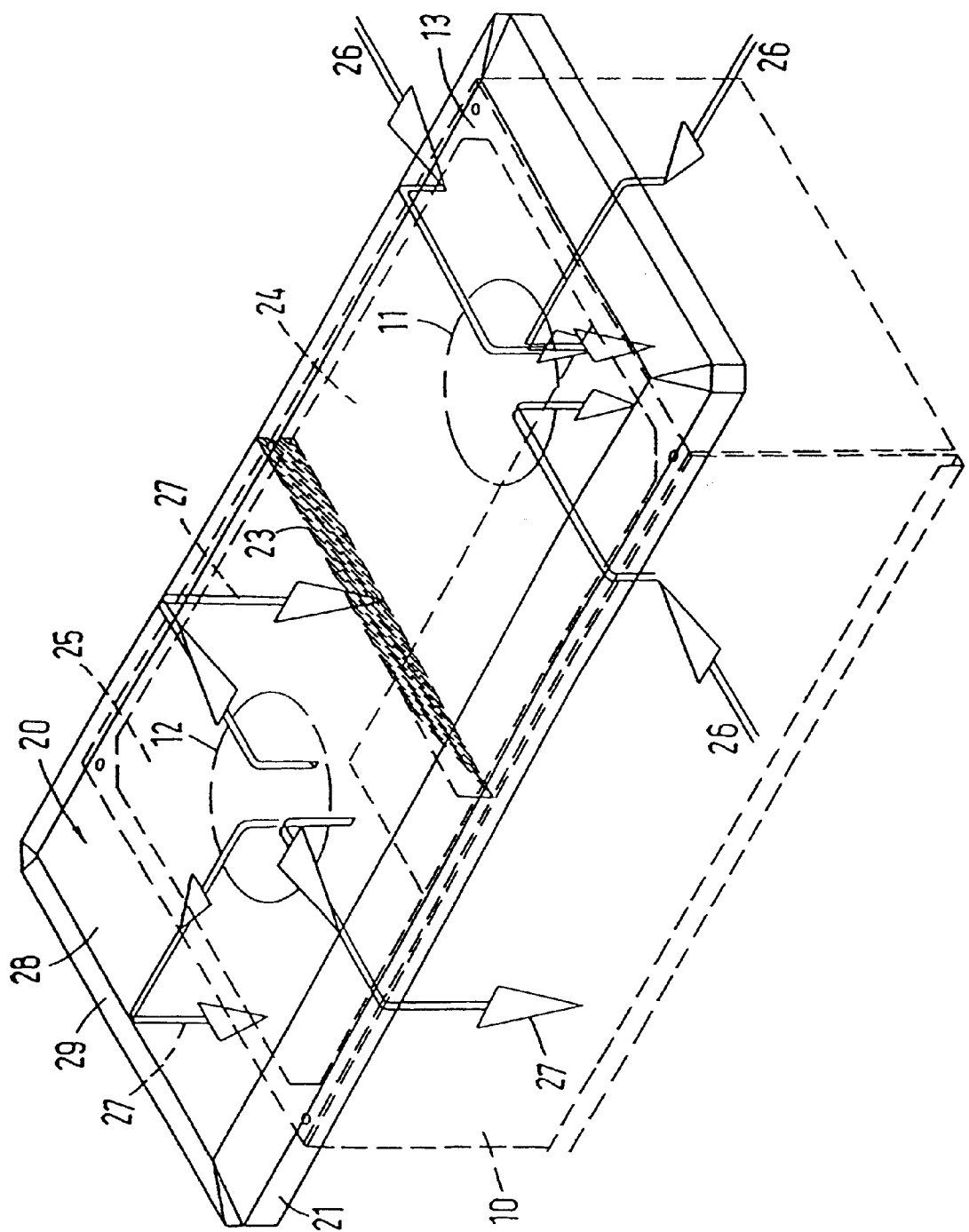

COOLER FOR FITTING ON A CONTROL BOX

RELATED APPLICATION AND CLAIM OF PRIORITY

This application is related to PCT Application No. PCT/EP97/00661 having an international filing date of Feb. 13, 1997, which designates at least one country in addition to the United States and which claims priority from German Application No. 196 09 796.7 filed Mar. 13, 1996. For priority purposes, this application claims the benefit of 35 USC 371.

FIELD OF INVENTION

The invention relates in general to a cooling device that can be placed on a covering wall of a control box, and more specifically to a cooling device that can be connected to a control box by means of an inlet opening.

BACKGROUND OF THE INVENTION

A control box that is surrounded on all sides by a shell is specified in DE295 19 260 U1. Such a cooling device which can be placed on the cover wall of the control box includes a roof element that, while connected to the upper side of the cooling device, projects beyond the cooling device housing on all sides.

As a rule, cooling devices such as the one disclosed in DE 37 10 566 C2, have an air inlet in the side wall for fresh air, and an air outlet for warmed exhaust air. The air inlet and air outlet are then covered by means of a ventilation screen. While such a ventilation screen is useful in preventing moisture and dirt particles from entering the air inlet once the cooling device is in operation, it offers no guarantee that moisture and dirt particles will not penetrate into the control box through the air conditioner while the control box and air conditioner are being set up in the field.

OBJECT OF THE INVENTION

An object of the invention is to provide a cooling device that overcomes some of the problems and shortcomings of the prior art.

Another object of the invention is to provide a cooling device that improves the protection afforded the cooling device and the control box with regard to moisture, in particular rain or the like, and particles of dirt. How these and other objects are accomplished will become apparent from the following descriptions and from the drawings.

SUMMARY OF THE INVENTION

This invention involves a cooling device that is connected to a cover wall of a control box by an inlet opening in such a manner that the housing of the upper side of the cooling device that faces away from the control box is provided with both an air inlet and an air outlet. A roof element covers the upper side of the cooling device. Said roof element, which is separated by a space from the cooling device housing, projects beyond the cooling device housing on all sides thereby forming a circumscribing ventilation slot that is open in a downward direction. At least two chambers, which are connected to both the air inlet and outlet, are formed in the roof element by means of separating sheet metal.

In one embodiment of the invention, the lateral walls of the cooling device housing can be closed completely. In such an embodiment, rain and the like drips off over the edge of the roof element. Also, the air inlet and the air outlet are covered by the roof element thus, protecting them from various forms of precipitation as well as dirt particles. Greater protection from the elements can also be provided by covering at least the air inlet with a ventilation screen.

In yet another embodiment, protection from rain is improved in that the roof element is provided with a circumscribing downwardly-inclined edge that overlaps at least one of the lateral walls of the cooling device. Rain runoff is thereby simplified by having the roof element feature a horizontally oriented cover plate that transitions into the edge by means of inclined transition sections that drop off. Furthermore, the corners of the roof element are beveled in the area of the roof edge and the transition sections.

In still another embodiment, the design of the cooling device is adapted to the cross sectional shape of the control box and is characterized by the fact that the cooling device housing is rectangular in cross section with a substantially centered separating wall that is oriented parallel to the narrow sides of the cooling device housing. In such an embodiment, the air inlet and outlet chambers are positioned one behind the other in the direction of the longitudinal sides of the cooling device housing.

In a preferred embodiment of the invention, the formation of the ventilation slot and the air inlet and outlet chambers in the area of the roof element results from the roof element being connect to the cooling device housing through the use of spacer elements that are arranged in the corner areas of the upper side of the cooling device housing.

A complete separation of the air inlet and outlet chambers is achieved by having the separating sheet metal supported on the upper side of the cooling device housing while being adapted to the inner cross section of the roof element.

The invention is explained in more detail on the basis of the exemplified embodiment shown in the drawings.

BRIEF DESCRIPTION OF THE DRAWINGS

FIG. 1 is a perspective view of the cooling device housing.

DETAILED DESCRIPTION OF PREFERRED EMBODIMENTS

The cooling device housing 10 receives the components of the cooling device in the known manner and is connected to the suction opening provided in the floor of the cooling device housing 10. The construction of the air conditioning device can be carried out in the known manner. Details of such a device are not shown here, since they are not of importance to the present invention.

According to the invention, as shown in FIG. 1, an air inlet 11 and an air outlet 12 are provided in the upper side 13 of the cooling device housing 10. In such an embodiment, at least the air inlet 11 is capable of being provided with a ventilation screen in order to improve protection from rain and dust.

In one embodiment of the invention, the upper side of the cooling device housing 10 is covered by a roof element 20 that is fastened to the cooling device housing 10 with some spacing, e.g., using spacer elements in the area of the corners. The roof element 20 comprises a horizontal cover plate 28 that transitions into a circumscribing, vertical edge 21 by means of a downwardly inclined transition section 29. The edge 21 of the attached roof element 20 partially overlaps at least one of the lateral walls of the cooling device housing 10, but maintains a circumscribing ventilation slot that is open in the downward direction.

In another embodiment, the roof element 20 is subdivided into two chambers 24 and 25 by means of separating sheet metal 23, such that the chamber 24 is positioned above the air inlet 11 and the chamber 25 is positioned above the air outlet 12. In such embodiment the separating wall 23 parallel to the narrow sides of the cooling device housing subdivides the roof element 20 such that both chambers 24 and 25, and the air inlet 11 and the air outlet 12, are positioned one behind the other in the direction of the longitudinal sides of the cooling device housing 10.

As the arrows 26 show, fresh air can reach chamber 24 and cooling device housing 10 by means of air inlet 11. The warmed exhaust air exiting the cooling device housing 10 reaches the chamber 25 by means of air outlet 12 and can flow from this on three sides, as is shown by arrows 27.

Although the cross sectional shape of the cooling device housing 10 and the roof element 20 can be designed in a different manner. The subdivision of the roof element 20 by means of the separating sheet metal 23 into chambers 24 and 25 must always be carried out such that one chamber 24 is connected to the air inlet 11 and the other chamber 25 is connected to the air outlet 12.

For reasons of appearance, the transition sections 29 and the edge 21 can incline in the area of the corners of the roof element 20.

The separating sheet metal 23 can be adapted to the inner cross section of the roof element 20 so that it can rest on the upper side 13 of the cooling device housing 10 in order to completely separate the chambers 24 and 25 from each other.

While the principles of the invention have been shown and described in connection with but a few embodiments, it is to be understood clearly that such embodiments are by way of example and are not limiting.

What is claimed:

1. In a cooling device capable of fitting on a cover wall of a control box wherein said cooling device is connected to the control box by an inlet opening, the improvement comprised of:

the cooling device having a housing with an upper side that faces away from the control box;

the upper side includes an air inlet and an air outlet;

a plurality of spacer elements connect a roof element to the upper side of the cooling device housing;

the roof element projects beyond the cooling device housing on all sides thereby forming a circumscribing ventilation slot that is open in a downward direction; and a separating wall separates the roof element into least two chambers in such a manner so as to allow the first chamber to connect to the air inlet and the second chamber to the air outlet.

2. The cooling device of claim 1 wherein the housing has lateral walls and the roof element has a circumscribing edge that is angled downwardly and partially overlaps at least one of the lateral walls of the cooling device housing.

3. The cooling device of claim 1 wherein:

the cooling device housing has two longitudinal sides and two narrow sides;

the separating wall is rectangular in cross section is approximately centered parallel to the narrow sides of the cooling device housing; and the first and second chambers are positioned on opposite sides of the separating sheet metal in the direction of the longitudinal sides.

4. The cooling device of claim 1 wherein:

the cooling device housing has two longitudinal sides and two narrow sides;

the separating wall is rectangular in cross section is approximately centered parallel to the longitudinal sides of the cooling device housing; and the first and second chambers are positioned on opposite sides of the separating sheet metal in the direction of the narrow sides.

5. The cooling device of claim 1 wherein:

spacer elements are arranged in the corner areas of the upper side; and the spacer elements connect the roof element to the cooling device housing.

6. The cooling device of claim 1 wherein the roof element has a horizontally oriented cover plate with inclined transition sections located near its outer edge.

7. The cooling device of claim 6 wherein the corners of the roof element are beveled near the edge and the transition sections.

8. The cooling device of claim 1 wherein at the least air inlet is provided with a ventilation screen.

9. The cooling device of claim 1 wherein the separating wall is adapted to the inner cross section of the roof element and is supported on the upper side of the cooling device housing.

* * * * *